United States Patent
Feldmann et al.

(10) Patent No.: US 9,488,069 B2
(45) Date of Patent: Nov. 8, 2016

(54) COOLING-AIR GUIDANCE IN A HOUSING STRUCTURE OF A TURBOMACHINE

(71) Applicant: MTU Aero Engines AG, Munich (DE)

(72) Inventors: Manfred Feldmann, Eichenau (DE); Norbert Schinko, Munich (DE); Christian Eichler, Munich (DE); Sebastian Kaltenbach, Munich (DE)

(73) Assignee: MTU Aero Engines AG, Munich (DE)

( * ) Notice: Subject to any disclaimer, the term of this patent is extended or adjusted under 35 U.S.C. 154(b) by 521 days.

(21) Appl. No.: 14/059,988

(22) Filed: Oct. 22, 2013

(65) Prior Publication Data
US 2014/0112767 A1     Apr. 24, 2014

(30) Foreign Application Priority Data
Oct. 23, 2012 (EP) .................................... 12189548

(51) Int. Cl.
*F01D 25/24* (2006.01)
*F01D 25/14* (2006.01)
*F01D 25/12* (2006.01)

(52) U.S. Cl.
CPC .............. *F01D 25/14* (2013.01); *F01D 25/12* (2013.01); *F01D 25/145* (2013.01); *F01D 25/246* (2013.01); *F05B 2260/221* (2013.01); *Y02T 50/676* (2013.01)

(58) Field of Classification Search
CPC ...... F01D 25/14; F01D 25/145; F01D 25/26; F01D 11/08; F01D 11/12; F01D 11/122; F01D 11/125; F01D 11/127
USPC ......... 415/173.1, 173.6, 173.4, 173.5, 174.5, 415/174.4
See application file for complete search history.

(56) References Cited

U.S. PATENT DOCUMENTS

| | | | |
|---|---|---|---|
| 4,053,254 A | 10/1977 | Chaplin | |
| 4,242,042 A | 12/1980 | Schwarz et al. | |
| 4,512,712 A * | 4/1985 | Baran, Jr. ............. | F01D 25/246 415/116 |
| 4,925,365 A * | 5/1990 | Crozet .................. | F01D 25/246 415/170.1 |
| 6,179,557 B1 | 1/2001 | Dodd et al. | |
| 6,902,371 B2 | 6/2005 | Anderson, Jr. et al. | |

FOREIGN PATENT DOCUMENTS

| | | |
|---|---|---|
| EP | 0134186 | 3/1985 |
| EP | 0356305 | 2/1990 |
| EP | 0618349 | 10/1994 |
| EP | 1106785 | 6/2001 |
| GB | 2378730 | 2/2003 |
| WO | WO 92/17686 | 10/1992 |
| WO | WO 2005/003520 | 1/2005 |

* cited by examiner

*Primary Examiner* — Richard Edgar
(74) *Attorney, Agent, or Firm* — Davidson, Davidson & Kappel, LLC

(57) ABSTRACT

A housing structure for a turbomachine, the housing structure annularly surrounding, at least partially, a flow channel (14) in which guide vanes and rotor vanes are arranged. The housing structure has an inner wall (2) that delimits the flow channel and an outer wall (1) that is closed off vis-à-vis the environment. A heat-protection plate (3) is arranged on the radial outside of the inner wall, and insulation (4) is arranged between the heat-protection plate and the outer wall. At least one cooling-air channel (6) is formed between the insulation and the radial inside of the outer wall, the cooling-air channel (6) having at least one air-guiding element (5) resting against the insulation.

9 Claims, 3 Drawing Sheets

COOLING-AIR GUIDANCE IN A HOUSING STRUCTURE OF A TURBOMACHINE

This claims the benefit of European Patent Application EP 12189548.6, filed Oct. 23, 2012 and hereby incorporated by reference herein.

The present invention relates to a housing structure for a turbomachine, especially for a stationary gas turbine or a jet engine, said housing structure annularly surrounding, at least partially, a flow channel in which guide vanes and rotor vanes are arranged.

BACKGROUND

In turbomachines such as stationary gas turbines or jet engines, air is drawn in along a flow channel, compressed and burned together with fuel in a combustion chamber, a process in which the combustion gases are subsequently expelled via the flow channel in order to drive rotors in a turbine. Moreover, there are guide vanes arranged in the flow channel to guide the fluid. The flow channel with the guide vanes and rotor vanes is completely surrounded by a housing structure which not only is exposed to mechanical loads but which especially also has to ensure that a high temperature difference can be achieved between the fluid in the flow channel and the outside of the housing.

For this purpose, the housing structure can have heat-protection plates and insulation that serve to establish a steep temperature gradient from the flow channel to the outer wall of the housing. In addition, cooling air can be fed into the housing structure in order to dissipate surplus heat.

The state of the art such as, for instance, British published patent application GB 2378730 A has already disclosed such housing structures, which have a cooling-air channel in the immediate vicinity of the inner wall of the housing directly on the flow channel.

U.S. Pat. No. 6,179,557 B1 proposes a cooling procedure entailing a cooling channel whose direction changes, so that cooling air first flows in a first outer part along the direction of flow of the fluid in the flow channel, after which it flows back in the opposite direction and is released into the flow channel. Other housing structures having cooling capabilities are described in international patent application WO 2005/003520 A1, U.S. Pat. No. 6,902,371 B2 and European patent application EP 1106785 A1.

SUMMARY OF THE INVENTION

However, the prior-art housing structures entail the problem that the known cooling capabilities only yield satisfactory results over short sections of the housing since a very strong heating of the cooling air already occurs in the correspondingly short sections.

It is an object of the present invention to provide an effective cooling for larger sections of a housing structure of a stationary gas turbine or jet engine, so that the cooling efficiency is increased. At the same time, however, the technical solution should be easy to implement.

The present invention provides that the cooling air should only be used in an outer section of the housing structure in order to improve the cooling efficiency since the temperature difference between the cooling-air temperature and the components that are to be cooled is smaller in the outer section of the housing structure and consequently, the cooling air likewise heats up to a lesser extent. In this manner, the cooling air can cool longer sections of the housing structure while insulation and heat-protection plates can be used to establish a temperature gradient in the inner sections of the housing structure, in other words, in the direction of the flow channel.

Accordingly, when it comes to a housing structure for a turbomachine, the invention proposes that a cooling-air channel be provided between an inner wall that delimits the flow channel and an outer wall of the housing structure that is closed off vis-à-vis the environment in such a way that it is a distance from the inner wall. Preferably, the cooling-air channel can be arranged adjacent to or resting against the outer wall, and it has at least one air-guiding element that can form the cooling-air channel, for example, together with the outer wall. In particular, the air-guiding element can ensure that the cooling air is kept in the outer section of the housing structure.

Moreover, starting from the inner wall towards the outside, a heat-protection plate and/or insulation can be provided in this order, so that the cooling-air channel is arranged between the insulation and/or the heat-protection plate and the radial inside of the outer wall of the housing. Accordingly, the cooling-air channel can be configured so as to rest against the insulation and/or the heat-protection plate, or else so as to be at least partially delimited by the insulation and/or the heat-protection plate. Between the insulation and/or the heat-protection plate, there can preferably be an air-guiding element that can also minimize the heating of the cooling air by preventing direct contact with the insulation and/or with the heat-protection plate. As a result, the cooling-air channel can effectively cool additional housing sections located downstream. The insulation can also be formed by several heat shields or heat-protection plates arranged radially one behind the other.

The air-guiding element can be configured as an air baffle which is formed so that it annularly surrounds the flow channel at least partially and preferably completely, and so that it can form the cooling-air channel through its arrangement at a distance from the inside of the outer wall of the housing. If the air baffle has a preferably complete annular structure, then housing components that ensure the mechanical stability such as, for instance, the outer wall of the housing, can be dimensioned to be weaker since the air baffle contributes to the mechanical stability.

The air baffle is preferably configured so as to rest against the insulation, whereby most of the air baffle can be in direct contact with the insulation. It is possible for only parts of the air baffle to be configured as radially projecting spacers in order to keep the air baffle at a radial distance from the inside of the outer wall of the housing.

According to another embodiment, the air baffle can also be configured in the form of a tube element that can especially be arranged in a recess or slit in the insulation or that can be formed by this. Accordingly, several tube elements can be provided that are distributed along the circumference of the housing structure. The tube elements can have different cross sectional shapes such as that of a circle, rectangle, square, hexagon or the like.

The air-cooling channel, which is preferably arranged between the insulation and the radial inside of the outer wall of the housing, can be configured in the area above a rotor vane stage, whereby the inner wall of the housing can be formed by a seal support structure that can have an abradable coating or a friction coating on the side of the flow channel in order to form a so-called outer air seal. The abradable or friction coating serves to make contact with sealing tips of the rotor vanes so that the flow channel is sealed in the radial direction and the fluid cannot flow past the radial outside of the rotor vanes without their being actuated.

The cooling-air channel can have an inlet end to admit the cooling air and an outlet end to convey the cooling air further into adjacent housing sections, whereby the outlet end can be configured in such a way that the cooling air flows out at least partially, preferably completely, in the extension of the axial direction of the cooling channel. The term extension of the axial direction refers to the flow direction that has at least one directional component along the axial direction of flow in the cooling channel, which normally runs along, preferably parallel to or virtually parallel to, the direction of flow of the fluid in the flow channel. Accordingly, the cooling air discharged from the flow channel can cool downstream sections of the housing.

BRIEF DESCRIPTION OF THE DRAWINGS

The accompanying figures show the following in a purely schematic form.

DETAILED DESCRIPTION

Additional advantages, characteristics and features of the present invention will be explained below in the detailed description of embodiments. However, the invention is not restricted to these embodiments.

Figure 1:
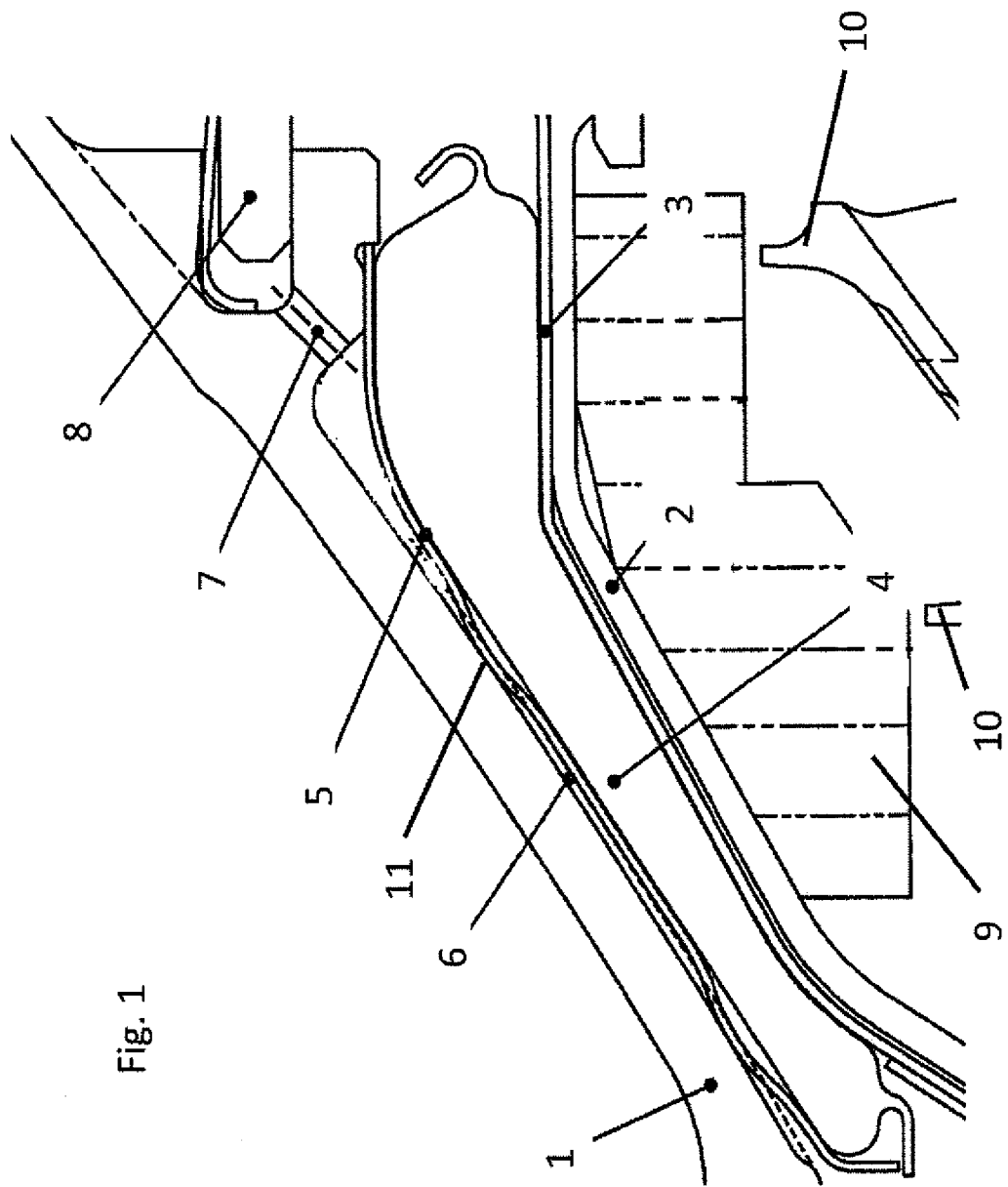
FIG. 1 a partial cross-sectional view of a housing structure of a jet engine.

FIG. 1 shows a partial cross section through the housing structure of a jet engine, comprising an outer housing wall 1 and an inner housing wall 2 which, in the embodiment shown, is formed by a seal support structure that is also referred to as a liner segment. A friction or abradable coating 9 is applied onto the seal support structure 2, and this coating constitutes an outer seal, the so-called outer air seal (OAS), for the rotor vanes that rotate in the flow channel 14, whereby only two rotor vane tips 10 are shown in FIG. 1. During operation, the rotor vane tips 10 come into contact with the friction or abradable coating 9 of the seal support structure 2, thus forming, together with the friction or abradable coating 9, the seal in the radial direction, so that fluid in the flow channel 14 cannot flow past the rotor vanes radially on the outside without having driven them.

Adjacent to the seal support ring or to the seal support structure 2, the housing structure in FIG. 1 has a heat-protection shield 3 in the form of a heat-protection plate that, like the seal support structure, annularly surrounds the flow channel 14, whereby a completely continuous ring structure or a segmented structure can be provided.

Figure 3:
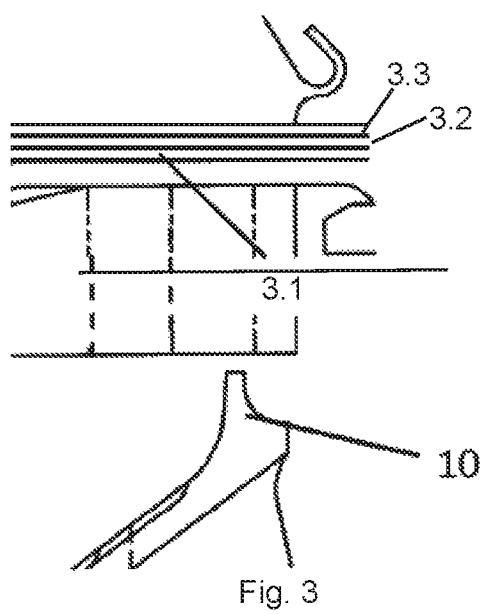
FIG. 3 shows the view of FIG. 1 modified to include several heat-protection plates arranged radially one behind the other.

Adjacent to the heat-protection plate 3 in the radial direction towards the outside, there is insulation 4 that is meant to make it more difficult for heat to be transported to the outside. The insulation 4 is made of a suitable insulating material. As an alternative, the insulation 4 can be replaced by several heat-protection plates 3.1, 3.2, 3.3 that are arranged radially one behind the other as illustrated in FIG. 3.

An air baffle 5 that delimits a cooling-air channel 6 in the direction of the insulation 4 is adjacent to and largely rests against the insulation 4. The air baffle 5 rests largely or for the most part against the insulation 4 and has spacers 11 that are situated only at certain intervals and that keep the air baffle 5 at a distance from the outer housing wall 1, thus ensuring that the air baffle 5 and the inside of the outer housing wall 1 can form the cooling-air channel 6. The air baffle is not only responsible for forming the cooling-air channel but, at the same time, it prevents a direct contact of the cooling air with the insulation 4 and prevents the cooling air from flowing into the areas between the heat-protection plate 3 and the insulation 4. Moreover, the heat-protection plate 5 [sic], if it is configured as a closed ring, as is the case in the present embodiment, makes an additional contribution to the mechanical stability, so that other components of the housing structure such as, for example, the outer housing wall 1, can be dimensioned so as to be weaker, The cooling channel 6 makes it is possible to keep cooling air on the outside of the housing structure, so that an effective cooling can be achieved and cooling air at a sufficiently low temperature can be made available, even in downstream areas.

Accordingly, the cooling-air channel 6 is configured in such a way that it has an outlet end 7 that is configured, for instance, in the form of a hole in the outer housing wall 1 in order to convey the cooling air essentially in the extension of the axial direction of the cooling-air channel 6 to downstream sections of the housing structure such as, for example, the next guide vane stage, whose bracket 8 can be seen in FIG. 1.

Figure 2:
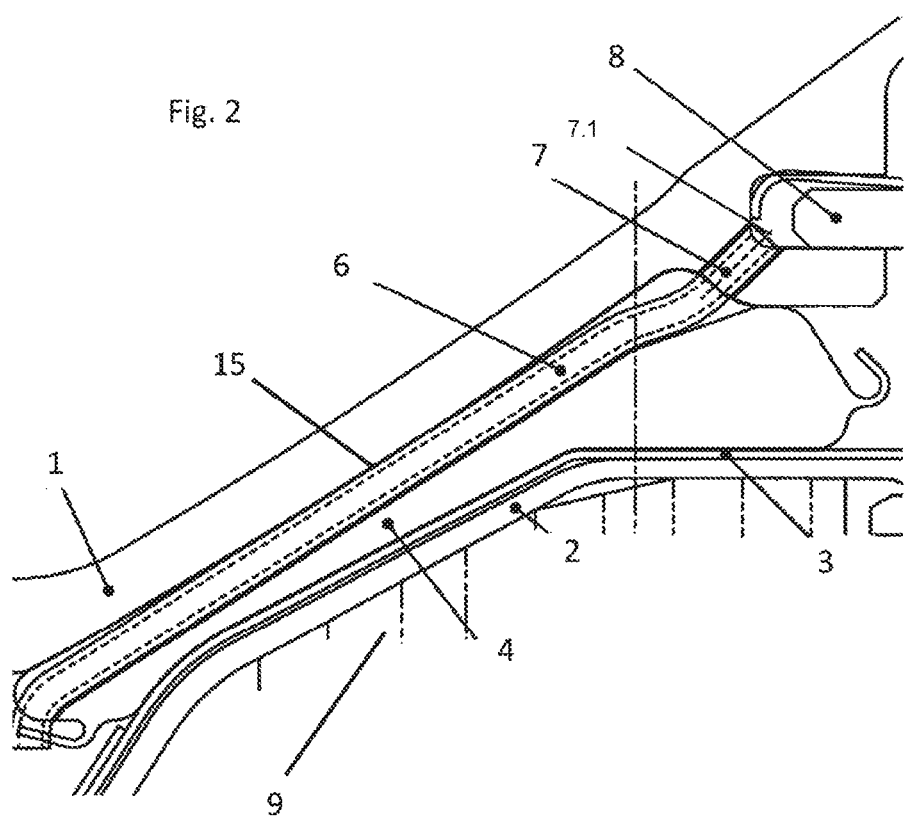
FIG. 2 a partial cross-sectional view of a second housing structure of a jet engine.

FIG. 2 shows a second embodiment of a housing structure according to the invention, in which once again, the outer housing wall 1 and the inner housing wall 2 are arranged in the form of a seal support structure in the area of a rotor vane stage. The friction or abradable coating 9 is only partially shown in FIG. 2, and the rotor vanes and their sealing tips have been completely omitted.

Here, once again, a heat-protection plate 3 is provided on the radial outside of the inner housing wall 2. Beyond the heat-protection plate 3, insulation 4 follows once again, in the radially outward direction. Unlike the embodiment in FIG. 1, however, no air baffle is provided in the embodiment in FIG. 2, but rather, several cooling-channel tubes 15, which are arranged in corresponding recesses or slits in the insulation 4 between the insulation 4 and the outer housing wall 1. The channel tubes 15 each form part of the cooling-air channel 6 whereby, for instance, the outlet end 7 of the channel tubes 15 is accommodated in a corresponding opening or hole in the outer housing wall 1 so that, in turn, the exiting cooling air is discharged in the extension of the axial direction 7.1 of the channel tube 15.

Even though the invention has been described in detail with reference to the embodiments, it is obvious to the person skilled in the art that the invention is not restricted to this embodiment, but rather, that individual or several of the features presented can be either omitted or else combined with each other in some other way, provided that they do not depart from the scope of protection of the accompanying claims. In particular, the present disclosure encompasses all combinations of all of the individual features presented here.

What is claimed is:

1. A housing structure of a turbomachine, the housing structure annularly surrounding, at least partially, a flow channel, guide vanes and rotor vanes being arranged in the flow channel, the housing structure comprising:
    an inner wall delimiting the flow channel;
    an outer wall closed off vis-à-vis the environment;
    a cooling-air channel formed at a distance from the inner wall and having at least one air-guiding element, the cooling-air channel guiding the cooling air exclusively at a distance from the inner wall;
    a heat-protection plate and insulation, wherein the insulation is arranged between the heat-protection plate and the cooling-air channel, wherein the cooling-air channel is formed between the insulation and a radial inside of the outer wall, the cooling-air channel having the at least one air-guiding element resting against the insulation.

2. The housing structure as recited in claim 1 wherein the air-guiding element is configured as an air baffle annularly surrounding the flow channel at least partially.

3. The housing structure as recited in claim 2 wherein the baffle annularly surrounds the flow channel completely.

4. The housing structure as recited in claim 3 wherein the air baffle has spacers towards a radial inside of the outer wall.

5. The housing structure as recited in claim 1 wherein the air-cooling channel is configured in the area of the rotor vanes.

6. The housing structure as recited in claim 1 wherein the cooling-air channel has an inlet end to admit the cooling air and an outlet end to convey the cooling air further into adjacent housing sections, the outlet end configured in such a way that the cooling air flows out at least partially in an axial direction.

7. The housing structure as recited in claim 6 wherein the cooling air flows out completely in the axial direction.

8. A housing structure of a turbomachine, the housing structure annularly surrounding, at least partially, a flow channel, guide vanes and rotor vanes being arranged in the flow channel, the housing structure comprising:
   an inner wall delimiting the flow channel;
   an outer wall closed off vis-à-vis the environment;
   a cooling-air channel formed at a distance from the inner wall and having at least one air-guiding element, the cooling-air channel guiding the cooling air exclusively at a distance from the inner wall;
   wherein the at least one air guiding element includes several air-guiding elements in the form of tube elements.

9. A housing structure of a turbomachine, the housing structure annularly surrounding, at least partially, a flow channel, guide vanes and rotor vanes being arranged in the flow channel, the housing structure comprising:
   an inner wall delimiting the flow channel;
   an outer wall closed off vis-à-vis the environment;
   a cooling-air channel formed at a distance from the inner wall and having at least one air-guiding element, the cooling-air channel guiding the cooling air exclusively at a distance from the inner wall; and
   several heat-protection plates arranged radially one behind the other.

* * * * *